United States Patent
Hwang

(10) Patent No.: US 9,491,759 B2
(45) Date of Patent: Nov. 8, 2016

(54) METHOD AND APPARATUS FOR ASSIGNING CONNECTION IDENTIFIERS OF DEVICE-TO-DEVICE COMMUNICATIONS

(71) Applicant: Samsung Electronics Co. Ltd., Suwon-si, Gyeonggi-do (KR)

(72) Inventor: Pil-Yong Hwang, Gimpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 13/708,023

(22) Filed: Dec. 7, 2012

(65) Prior Publication Data

US 2013/0156000 A1    Jun. 20, 2013

(30) Foreign Application Priority Data

Dec. 15, 2011 (KR) .................. 10-2011-0135120

(51) Int. Cl.
*H04W 72/04* (2009.01)
*H04W 72/02* (2009.01)
*H04W 72/10* (2009.01)
*H04W 76/02* (2009.01)

(52) U.S. Cl.
CPC ....... *H04W 72/0453* (2013.01); *H04W 72/044* (2013.01); *H04W 76/021* (2013.01); *H04W 72/02* (2013.01); *H04W 72/0446* (2013.01); *H04W 72/10* (2013.01); *H04W 76/023* (2013.01)

(58) Field of Classification Search
None
See application file for complete search history.

(56) References Cited

U.S. PATENT DOCUMENTS

| | | | | |
|---|---|---|---|---|
| 7,948,944 | B2 * | 5/2011 | Li et al. | 370/330 |
| 2002/0044553 | A1 * | 4/2002 | Chakravorty | 370/392 |
| 2002/0071437 | A1 * | 6/2002 | Nishikado et al. | 370/395.63 |
| 2004/0017825 | A1 * | 1/2004 | Stanwood et al. | 370/468 |
| 2005/0232183 | A1 * | 10/2005 | Sartori et al. | 370/319 |
| 2008/0052152 | A1 * | 2/2008 | Yufik | 705/14 |
| 2008/0101213 | A1 * | 5/2008 | Mohanty et al. | 370/208 |
| 2009/0010179 | A1 * | 1/2009 | Laroia et al. | 370/254 |
| 2009/0016311 | A1 * | 1/2009 | Wu et al. | 370/342 |
| 2009/0017834 | A1 * | 1/2009 | Lim et al. | 455/450 |
| 2009/0019168 | A1 | 1/2009 | Wu et al. | |
| 2009/0111479 | A1 * | 4/2009 | Yamaguchi et al. | 455/450 |
| 2009/0135805 | A1 * | 5/2009 | Lee et al. | 370/350 |
| 2009/0135817 | A1 * | 5/2009 | Hulusi et al. | 370/389 |
| 2009/0168722 | A1 * | 7/2009 | Saifullah et al. | 370/331 |
| 2009/0232142 | A1 * | 9/2009 | Li | H04W 8/26 370/395.3 |
| 2010/0035626 | A1 * | 2/2010 | Iwamoto | 455/452.1 |
| 2010/0085973 | A1 * | 4/2010 | Li et al. | 370/395.3 |
| 2011/0103250 | A1 * | 5/2011 | Li et al. | 370/252 |
| 2011/0159909 | A1 * | 6/2011 | Lee et al. | 455/517 |

(Continued)

*Primary Examiner* — Bunjob Jaroenchonwanit
(74) *Attorney, Agent, or Firm* — Jefferson IP Law, LLP

(57) ABSTRACT

A method and a device for assigning connection identifiers for a device-to-device communication are provided. The method includes checking unused connection identifiers among all entire connection identifiers that can be used for the device-to-device communication, determining a certain number of candidate connection identifiers to be used for the device-to-device communication with the peer user equipment among the unused connection identifiers, transmitting first information relating to data characteristics of a connection to be generated with the peer user equipment to the peer user equipment, and receiving second information relating to at least one connection identifier selected in consideration of the data characteristics based on the first information from the peer user equipment. The second information indicates that at least one connection identifier mapped to respectively different time resource regions is assigned to the connection.

16 Claims, 7 Drawing Sheets

(56) References Cited

U.S. PATENT DOCUMENTS

2011/0263206 A1* 10/2011 Nagaraja .................... 455/62
2013/0064187 A1* 3/2013 Patil et al. .................. 370/329
2013/0065621 A1* 3/2013 Chang et al. ............... 455/500
2013/0128891 A1* 5/2013 Koponen et al. ........... 370/392
2013/0223408 A1* 8/2013 Brandt et al. .............. 370/331
2013/0272186 A1* 10/2013 Mohanty et al. ........... 370/312
2014/0057670 A1* 2/2014 Lim et al. ................... 455/509

* cited by examiner

METHOD AND APPARATUS FOR ASSIGNING CONNECTION IDENTIFIERS OF DEVICE-TO-DEVICE COMMUNICATIONS

PRIORITY

This application claims the benefit under 35 U.S.C. §119(a) of a Korean patent application filed on Dec. 15, 2011 in the Korean Intellectual Property Office and assigned Serial No. 10-2011-0135120, the entire disclosure of which is hereby incorporated by reference.

BACKGROUND OF THE INVENTION

1. Field of the Invention

The present invention relates to device-to-device communications. More particularly, the present invention relates to a method and an apparatus for assigning connection identifiers for use in the device-to-device communications.

2. Description of the Related Art

Following a development of a communication apparatus and a communication system, users of the communication apparatus are in need of services for easily obtaining or sharing desired information. Recently, an introduction of smart phones and tablet Personal Computers (PCs) has provided circumstances for obtaining and sharing a wide variety of information through a wireless communication. However, the wireless communication system has a problem in that the users may obtain or share desired information only when a communication infrastructure is constructed. In addition, it may not be easy for the wireless communication system to effectively provide minor but useful real-time information in a daily living space due to the complexity of the system or time delay.

Accordingly, a Device-to-Device (D2D) service in which a communication can be directly performed between devices is emerging. In the D2D service, communication is not performed between devices through network objects such as base stations. Rather, in the D2D service, communication is performed through a device-to-device communication link in a space without a communication infrastructure.

The devices that support the device-to-device service can discover a neighboring user equipment by preset resources during a preset time period and generate Connection IDentifiers (CID) for communication connections with a peer user equipment to perform communication. That is, if there is a plurality of user equipments that can attempt a device-to-device communication within a short range, a plurality of connections may exist among a plurality of devices, and the plurality of connections may simultaneously attempt data transmission. Each of the connections is identified by a unique CID, and the corresponding connection is approved if the corresponding CID is selected.

Each connection may transfer a large quantity of data or a small quantity of data depending on types of data transmission. That is, a user equipment can sporadically or periodically transmit or receive data even when a CID is assigned. In this case, a connection to which the CID is assigned occupies its own resources when the connection is not in use, and therefore there is a problem in that a waste of the resources assigned to the connection may result.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for effectively assigning Connection IDentifiers (CIDs) for a device-to-device communication in a communication system.

Another aspect of the invention is to provide a method and an apparatus for reducing a fixedly used amount of wireless resources by assignment of CIDs for a device-to-device communication.

Another aspect of the present invention is to provide a method and an apparatus for multiplexing CIDs for a device-to-device communication in a communication system.

In accordance with an aspect of the present invention, a method for assigning connection identifiers for a device-to-device communication is provided. The method includes checking unused connection identifiers among all connection identifiers that can be used for a device-to-device communication, determining a certain number of candidate connection identifiers to be used in a device-to-device communication with a peer user equipment among the unused connection identifiers, transmitting first information relating to the candidate connection identifiers and data characteristics of a connection to be generated with the peer user equipment to the peer user equipment, and receiving second information relating to one or more connection identifiers selected in consideration of the data characteristics based on the first information from the peer user equipment.

In accordance with another aspect of the present invention, a method for assigning connection identifiers for a device-to-device communication is provided. The method includes checking unused connection identifiers among all connection identifiers that can be used for the device-to-device communication, receiving first information relating to a certain number of candidate connection identifiers to be used for the device-to-device communication by a peer user equipment and data characteristics of a connection to be generated with the peer user equipment among the unused connection identifiers from the peer user equipment, selecting one or more connection identifiers in consideration of the data characteristics based on the first information, and transmitting second information relating to the selected one or more connection identifiers to the peer user equipment.

In accordance with another aspect of the present invention, a user equipment for assigning connection identifiers for a device-to-device communication is provided. The user equipment includes a controller that checks unused connection identifiers among all connection identifiers used for the device-to-device communication and determines a certain number of candidate connection identifiers to be used in the device-to-device communication with a peer user equipment among the unused connection identifiers, a transmitter that transmits first information relating to the candidate connection identifiers and data characteristics of a connection to be generated with the peer user equipment to the peer user equipment, and a receiver that receives second information relating to one or more connection identifiers selected in consideration of the data characteristics based on the first information from the peer user equipment.

In accordance with another aspect of the present invention, a user equipment for assigning connection identifiers for a device-to-device communication is provided. The user equipment includes a controller that checks unused connection identifiers among all connection identifiers used for the device-to-device communication and selects one or more connection identifiers based on a certain number of candidate connection identifiers to be used in the device-to-device communication by a peer user equipment among the unused connection identifiers and the data characteristics of the connection to be generated with the peer user equipment in consideration of the data characteristics, a receiver that receives first information relating to a certain number of candidate connection identifiers to be used in the device-to-device communication by the peer user equipment among the unused connection identifiers and data characteristics to be generated with the peer user equipment from the peer user equipment and provides the first information for the controller, and a transmitter that transmits second information relating to the selected one or more connection identifiers to the peer user equipment.

Herein, the second information indicates that one or more connection identifiers mapped to respectively different time resource regions are assigned to the connection.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
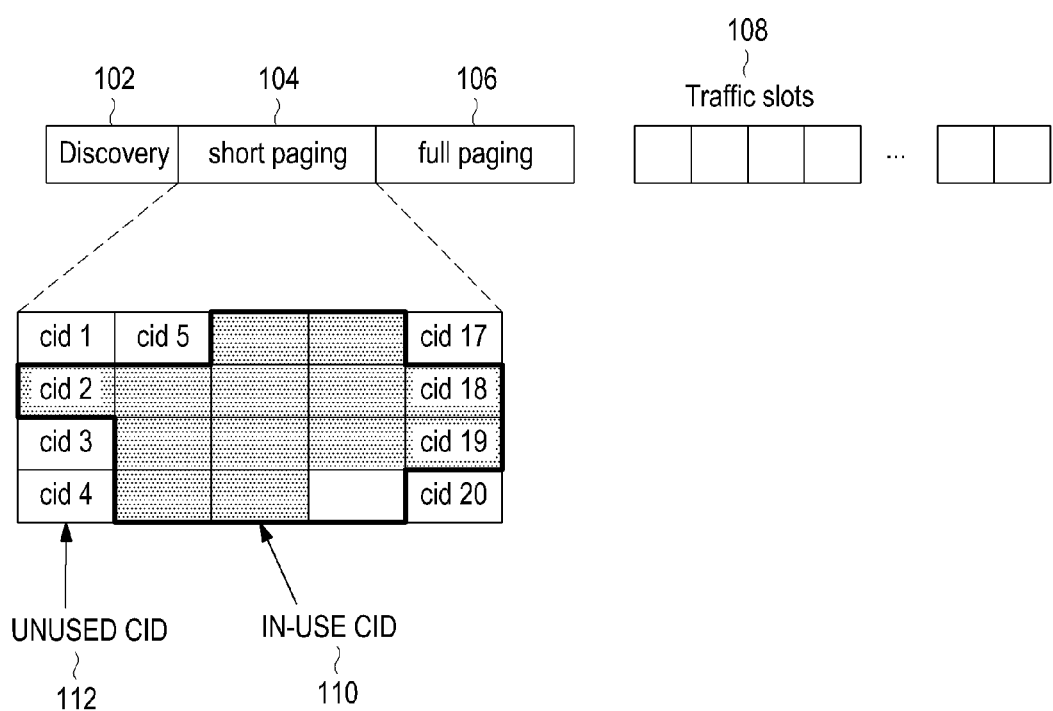
FIG. 1 is a diagram illustrating a procedure for a device-to-device communication according to an exemplary embodiment of the present invention.

FIG. 1 is a diagram illustrating a procedure for a Device-to-Device (D2D) communication according to an exemplary embodiment of the present invention.

Referring to FIG. 1, the device-to-device communication includes a discovery period 102, paging periods 104 and 106, and traffic slots 108. In the discovery period 102, a User Equipment (UE) that supports a device-to-device communication acquires synchronization with a neighboring user equipment, discovers the neighboring user equipment using predetermined points and resources, and acquires device information of the discovered neighboring user equipment. The device information may include identification information, an interest, an application program of the neighboring user equipment, and the like.

In the paging periods 104 and 106, each user equipment refers to the device information, attempts to page the neighboring device, and acquires a Connection Identifier (CID) to be used for a proceeding data exchange. The connection identifier is used for identifying a logical connection for each device-to-device communication.

The connection identifier assigned in the paging periods 104 and 106 has a unique resource to be used for a data exchange. During a paging period, each user equipment that requires a connection identifier listens to resources of each connection identifier, selects a connection identifier from among unused connection identifiers 112, and then notifies the selected connection identifier to the neighboring user equipments including a peer user equipment to perform a device-to-device communication.

The paging periods include a short paging period 104 and a full paging period 106. The short paging period 104 refers to a period when a procedure is performed for detecting whether or not each connection identifier is used during a predetermined listening period and selecting a connection identifier to be used for a connection with a peer user equipment. Each user equipment with a connection created in advance notifies neighboring user equipments that the connection identifier is in use, by including information about the connection identifier used by the user equipment on the resource corresponding to the connection of the user equipment and by transmitting the resource to the neighboring user equipments during the short paging period 104. Based on the information, all the user equipments can recognize unused connection identifiers 112 and in-use connection identifiers 110 among all connection identifiers and select connection identifiers to be used from among the unused connection identifiers 112.

The full paging period 106 refers to period when a procedure is performed for transmitting paging messages to and from a peer user equipment and assigning the selected connection identifier to be used for the connection with the peer user equipment.

As described above, the information on the connection identifier assigned in the paging periods 104 and 106 is periodically transmitted to the neighboring user equipments, for example, per periodic short paging period, and the neighboring user equipments can recognize in-use connection identifiers 110 based on the periodic information.

The connection identifiers assigned by the discovery and paging periods 102, 104, and 106 occupy wireless resources in a fixed manner. At this time, data transmission may be or may not be performed in a resource region corresponding to each connection identifier. Therefore, it is possible that a connection resource region in which transmission does not frequently occur is unnecessarily wasted.

Figure 2:
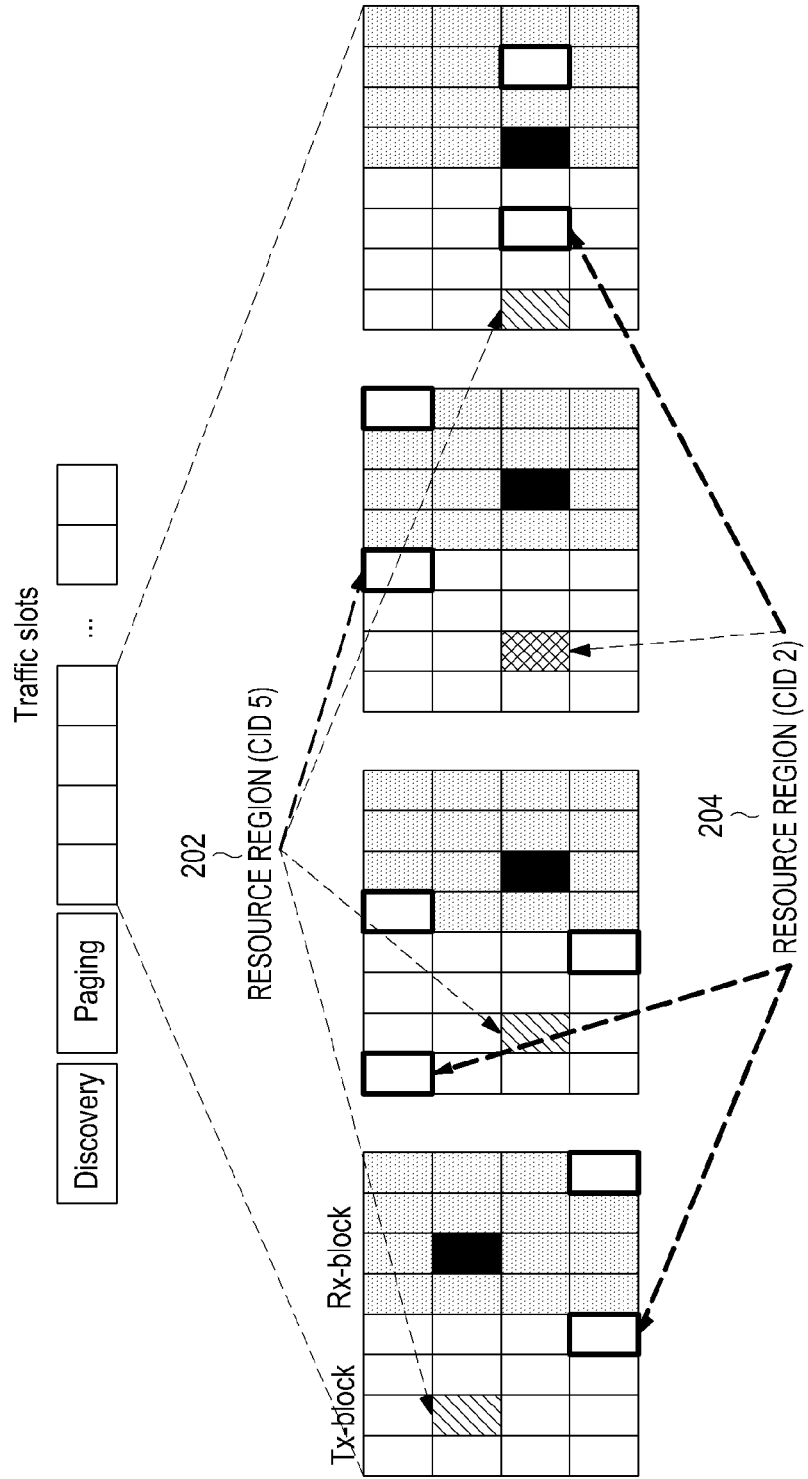
FIG. 2 is a diagram illustrating a waste of wireless resources in a device-to-device communication according to an exemplary embodiment of the present invention.

FIG. 2 is a diagram illustrating a waste of wireless resources caused by fixed assignment of resources to a connection identifier in a device-to-device communication according to an exemplary embodiment of the present invention.

Referring to FIG. 2, in a traffic period in which a traffic exchange occurs, the device-to-device communication is performed with a specific time resource region, for example, traffic slots that include transmission blocks and reception blocks. Each of the transmission blocks and the reception blocks includes subcarriers or subchannels in a frequency region and symbols in a time region, and is divided into a plurality of resource regions corresponding to a plurality of connection identifiers. Herein, data transmission occurs in 3 traffic slots out of 4 traffic slots in the resource region 202 mapped to CID5, but data transmission occurs in 1 traffic slot out of 4 traffic slots in the resource region 204 mapped to CID2. In this case, the resource mapped to CID2 may be wasted.

According to an exemplary embodiment of the present invention, all connection identifiers that can be assigned for a device-to-device communication are grouped into a plurality of groups. At this time, according to the frequency of data transmission, all connection identifiers in a certain group are assigned for a connection in which data transmission frequently occurs, and a subset of connection identifiers in a certain group is assigned for a connection in which data transmission occasionally occurs.

Figure 3:
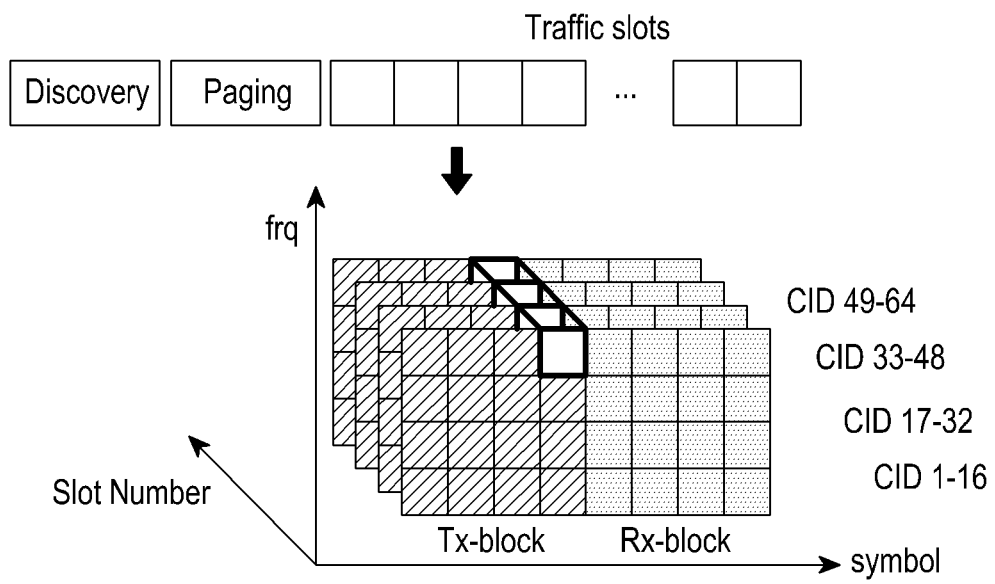
FIG. 3 is a diagram illustrating an example of a grouping of connection identifiers according to an exemplary embodiment of the present invention.

FIG. 3 is a diagram illustrating an example of a grouping of connection identifiers according to an exemplary embodiment of the present invention.

Referring to FIG. 3, connection identifiers CID1 to CID64 are unused for a device-to-device communication, and each connection identifier is mapped to at least one resource region that includes frequencies or symbols in the transmission blocks or the reception blocks. The connection identifiers are grouped into 16 groups, each of which includes 4 connection identifiers. For example, Group 1 includes CID1, CID17, CID33, and CID49, and Group 2 includes CID2, CID18, CID34, and CID50.

Connection identifiers that belong to one group correspond to respectively different layers, and the layers are assigned to respectively different traffic slots. Therefore, each group includes as many connection identifiers as the number of designated layers. In other words, each of the connection identifiers that belongs to one group is designated to be mapped to resource regions in respectively different traffic slots.

Figure 4:
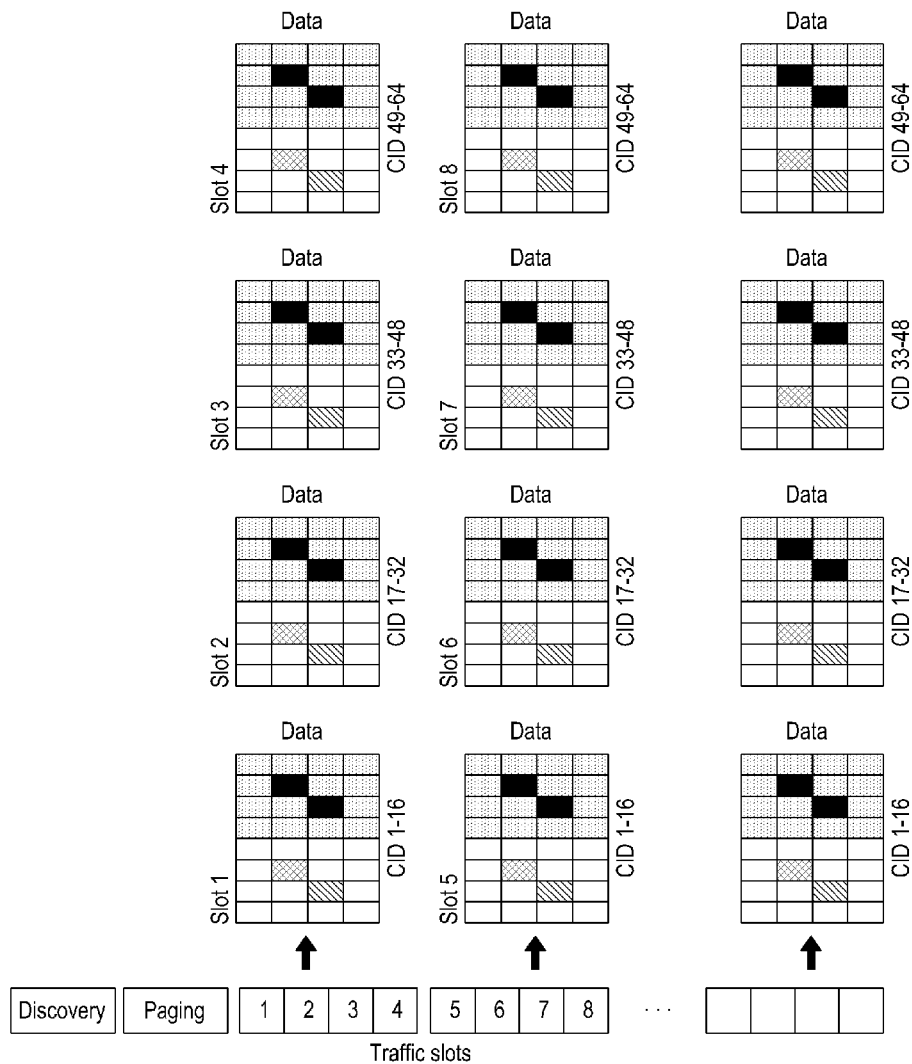
FIG. 4 is a diagram illustrating an example of mapping of connection identifiers and traffic slots according to an exemplary embodiment of the present invention.

FIG. 4 is a diagram illustrating an example of mapping of connection identifiers and traffic slots according to an exemplary embodiment of the present invention.

Referring to FIG. 4, CID1 to CID16 among unused connection identifiers CID1 to CID64 are mapped to Traffic Slot 1, CID17 to CID32 are mapped to Traffic Slot 2, CID33 to CID48 are mapped to Traffic Slot 3, and CID49 to CID64 are mapped to Traffic Slot 4. In the same manner, CID1 to CID16 are mapped to Traffic Slot 5, CID17 to CID32 are mapped to Traffic Slot 6, CID33 to CID48 are mapped to Traffic Slot 7, and CID49 to CID64 are mapped to Traffic Slot 8.

As to the groups of connection identifiers grouped as described above, all connection identifiers in a certain group are assigned in a connection in which data transmission frequently occurs, while a part of connection identifiers in a certain group is assigned in a connection in which data transmission occasionally occurs. Herein, the connection in which data transmission frequently occurs refers to, for example, a service in which data is successively transmitted, such as video communications and game streaming. In addition, the connection in which data transmission occasionally occurs refers to, for example, remote control or monitoring of a peer user equipment.

When a connection with a peer user equipment is set, each user equipment checks data characteristics corresponding to the connection, and determines a data type according to the checked data characteristics. That is, each user equipment determines whether the connection has a data type in which data transmission frequently occurs or a data type in which data transmission occasionally occurs. Herein, two data types according to the frequency of data transmission, that is, Qualities of Services (QoS) are described, but it would be appreciated that two or more data types can be defined according to the selection of system designers, operators, or users, and the number of connection identifiers appropriate to each of the data types may be designated by system designers, operators, or users.

Figure 5:
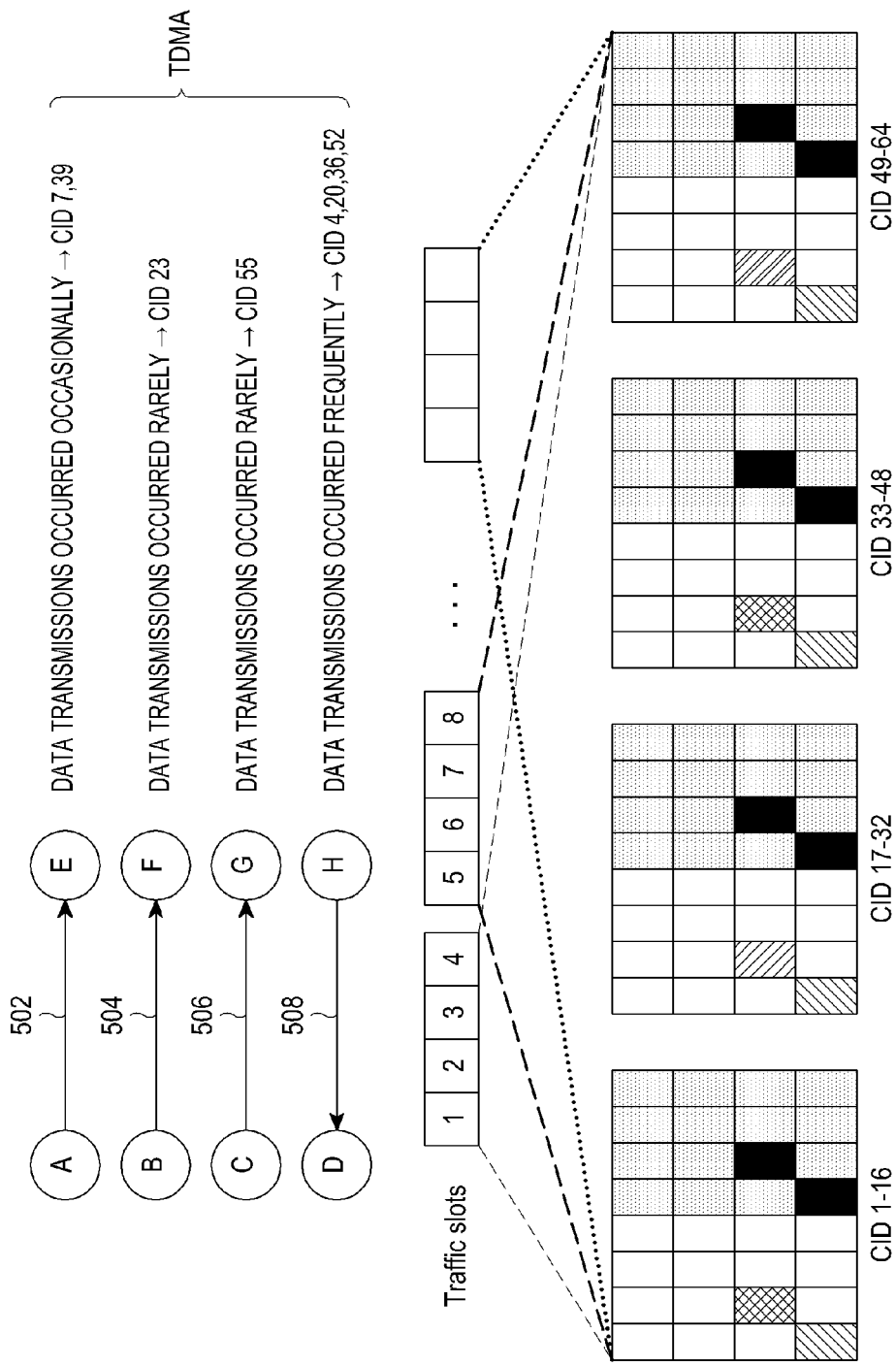
FIG. 5 is a diagram illustrating an example of another assignment of connection identifiers according to an exemplary embodiment of the present invention.

FIG. 5 is a diagram illustrating an example of another assignment of connection identifiers according to an exemplary embodiment of the present invention.

Referring to FIG. 5, a connection 502 from a user equipment A to a user equipment E has a data type (QoS) in which data transmission occasionally occurs. Therefore, two connection identifiers that belong to one group, for example, CID7 and CID39 that belong to Group 7 are assigned to the connection 502. A connection 504 from a user equipment F to a user equipment B and a connection 506 from a user equipment C to a user equipment G both have data types (QoS) in which data transmission rarely occurs. Therefore, one connection identifier is assigned to each of the connections 504 and 506, for example, to each of CID23 and CID55 that belong to Group 7. In the meantime, a connection 508 from a user equipment H to a user equipment D has a data type (QoS) in which data transmission frequently occurs. Therefore, all connection identifiers in a group, for example, CID4, CID20, CID36, and CID52 in Group 4 are assigned to the connection 508.

Herein, the connections 502, 504, and 506 to which connection identifiers belonging to the same group are assigned are multiplexed in the same traffic slots by Time Division Multiple Access (TDMA).

Referring to the resource assignment example illustrated in FIG. 4, a user equipment A has a chance to transmit data to a user equipment E through resource regions mapped to CID7 and CID39 during traffic slots 1 and 3, and user equipments B and C have chances to transmit data to user equipments F and G through resource regions mapped to CID23 and CID55 during traffic slots 2 and 4. In addition, a user equipment D has a chance to transmit data to a user equipment H through resource regions mapped to CID4, CID20, CID36, and CID52 through traffic slots 1, 2, 3, and 4.

For example, the grouping of the connection identifiers as described above may be designated by system designers or operators. In this case, manufacturers or operators may code and store the grouping information of the connection identifiers in each user equipment that supports a device-to-device communication, and at the time of performing a device-to-device communication, each user equipment may read the grouping information and use the grouping information for assigning connection identifiers.

According to another exemplary embodiment, the grouping of the connection identifiers may be performed by a base station in each cell or may be performed by an upper system. That is, the base station provides the grouping information of the connection identifiers for user equipments that are positioned in its own cell and that can perform a device-to-device communication. Otherwise, the upper system provides the grouping information of the connection identifiers for user equipments that are positioned in a cell managed by the upper system and that can perform a device-to-device communication.

Hereinafter, as an exemplary embodiment, an operation, in which upon a request of a user equipment that desires to perform a device-to-device communication, that is, a transmission user equipment, at least one connection identifier is assigned between a transmission user equipment and a peer equipment, that is, a reception user equipment according to QoS, will be described. That is, each of the transmission user equipment and the reception user equipment detects that an assignment of a connection identifier is required by transmitting or receiving a request signal for requesting a generation of a connection or an assignment of a connection identifier for a device-to-device communication and assigns at least one connection identifier that is appropriate to a required QoS according to the already-known grouping classification of connection identifiers.

Figure 6:
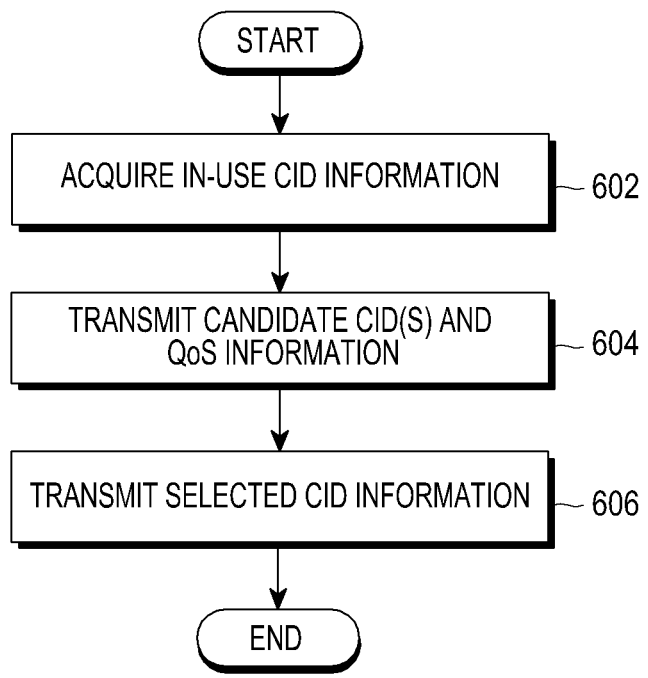
FIG. 6 is a flowchart illustrating an operation of a transmission user equipment for assigning connection identifiers according to an exemplary embodiment of the present invention.

FIG. 6 is a flow chart illustrating an operation of a transmission user equipment for assigning connection identifiers according to an exemplary embodiment of the present invention.

Referring to FIG. 6, in step 602, a user equipment that desires to perform a device-to-device communication, that is, a transmission user equipment, monitors and receives information on in-use connection identifiers transmitted from neighboring user equipments during a predetermined short paging period, and checks connection identifiers in use by itself or neighboring user equipments among all user equipments.

In step 604, the transmission user equipment determines a certain number of candidate connection identifiers among unused (that is, not in use) connection identifiers, and transmits QoS information relating to the determined candidate connection identifiers and the number of connection identifiers to be selected connection identifiers to a peer user equipment to perform a communication (that is, a reception user equipment). The connection identifiers of the reception user equipment can be acquired, for example, by a discovery step. Herein, the number of the candidate connection identifiers is determined to be identical to or at least larger than the number of connection identifiers required by desired QoS. As another exemplary embodiment, information on the number of connection identifiers needed for a desired QoS can be directly transmitted to a reception user equipment. The transmission user equipment can recognize the desired QoS with respect to an application to perform a communication with the reception user equipment.

In step 606, the transmission user equipment receives information on the connection identifiers selected by the reception user equipment. The received information includes at least one connection identifier selected in consideration of the candidate connection identifiers of the transmission user equipment, the candidate connection identifiers of the reception user equipment, and the QoS information. That is, according to the QoS in which the transmission user equipment and the reception user equipment are connected, the corresponding number of connection identifiers are selected by the reception user equipment and notified to the transmission equipment.

Figure 7:
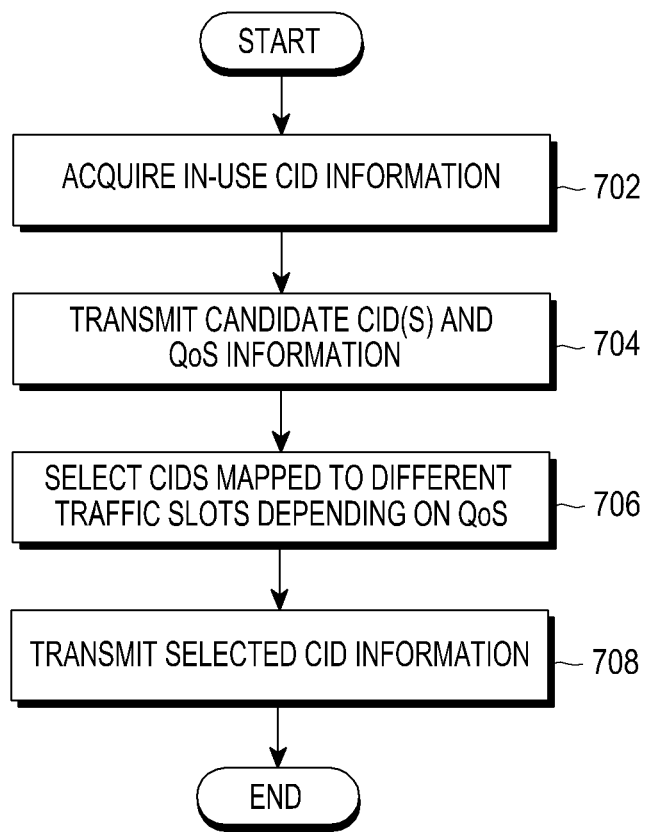
FIG. 7 is a flowchart illustrating an operation of a reception user equipment for assigning connection identifiers according to an exemplary embodiment of the present invention.

FIG. 7 is a flowchart illustrating an operation of a reception user equipment for assigning connection identifiers according to an exemplary embodiment of the present invention.

Referring to FIG. 7, in step 702, the reception user equipment monitors and receives information on in-use connection identifiers transmitted by neighboring user equipments during a predetermined short paging period, and checks connection identifiers in use by the reception user equipment and the neighboring user equipment among all the connection identifiers.

In step 704, the reception user equipment receives QoS information relating to the candidate connection identifiers determined by the transmission user equipment and the number of the connection identifiers to be selected together with the signal for requesting a device-to-device communication from the transmission user equipment. As another exemplary embodiment, instead of the QoS information, information on the number of the connection identifiers required in the desired QoS can be directly transmitted to the reception user equipment.

In step 706, the reception user equipment determines a certain number of candidate connection identifiers among unused (that is, not in use) connection identifiers except the in-use connection identifiers acquired in step 702 described above and selects at least one connection identifier to be used in a device-to-device communication between the transmission user equipment and the reception user equipment on the basis of the candidate connection identifiers of the transmission user equipment, the candidate connection identifiers of the reception user equipment, and the QoS information.

As a specific example, at least one candidate connection identifier of the transmission user equipment overlapped with the candidate connection identifiers of the reception user equipment is selected. As another embodiment, the reception user equipment selects at least one connection identifier among the candidate connection identifiers of the transmission user equipment. In another exemplary embodiment, when the transmission user equipment determines and transmits as many connection identifiers as needed for the QoS as candidate connection identifiers, the reception user equipment selects all the transmitted candidate connection identifiers transmitted from the transmission user equipment or selects at least one candidate connection identifier that is not used by the reception user equipment among the candidate connection identifiers transmitted by the transmission user equipment.

In step 708, the information on the selected at least one connection identifier is transmitted to the transmission user equipment, and then the selected at least one connection identifier and the corresponding resource regions are used for a device-to-device communication between the transmission user equipment and the reception user equipment.

Figure 8:
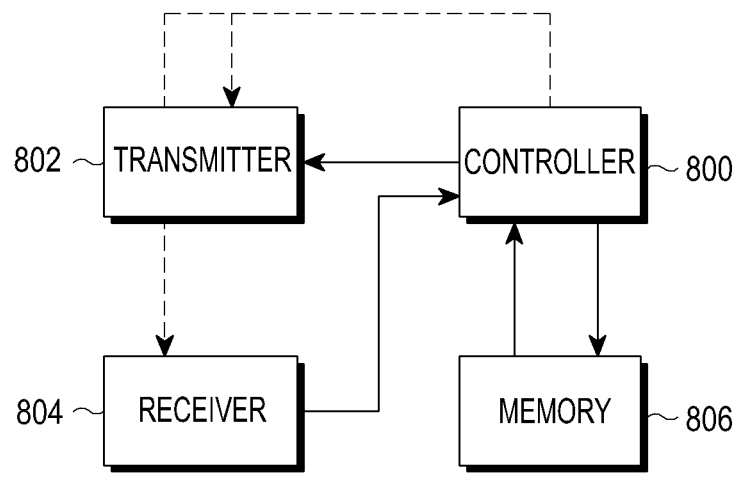
FIG. 8 is a block diagram illustrating a construction of a user equipment that supports a device-to-device communication according to an exemplary embodiment of the present invention.

FIG. 8 is a block diagram illustrating a configuration of a user equipment that supports a device-to-device communication according to an exemplary embodiment of the present invention. As illustrated in the drawing, the user equipment includes a controller 800, a transmitter 802 and a receiver 804 that can perform a device-to-device communication, and a memory 806 that stores information, program codes and the like relating to the device-to-device communication.

Referring to FIG. 8, the controller 800 controls so that the transmitter 802 transmits request signals for requesting the generation of connection and the assignment of the connection identifiers for the direct communication to a peer user equipment, candidate connection identifiers, and QoS information and controls so that the receiver 804 receives the request signals and information from the peer user equipment. The transmitter 802 is provided with the request signals and information from the controller 800, and transmits the request signals and information, and the receiver 804 transmits the request signals and information received from the peer user equipment to the controller 800.

In addition, the controller 800 controls so that information on the at least one connection identifier used by itself is transmitted by the transmitter 802 during a predetermined short paging period. At this time, the transmitter 802 transmits the in-use connection identifier information so as to be monitored and received by the neighboring user equipment.

If the request signals and information are transmitted through the transmitter 802, the controller 800 receives the selected connection identifier information transmitted from the peer user equipment through the receiver 804. Then, the controller 800 determines the connection identifiers to be used for the scheduling of the device-to-device communication with the peer user equipment based on the received selected connection identifier information and stores the connection identifiers in the memory 806.

When the request signals and information are received through the receiver 804, the controller 800 selects at least one unused connection identifier based on the QoS information of the peer user equipment, transmits the selected connection identifier information indicating the selected at least one connection identifier through the transmitter 802 to the peer user equipment, and stores the selected connection identifier information in the memory 806.

The exemplary embodiments of the present invention described herein provides an effect of saving wireless resources for transmission requests and responses which each CID occupies at the time of connection scheduling for a device-to-device communication.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for assigning connection identifiers for a device-to-device communication, the method comprising:
identifying unused connection identifiers among a plurality of connection identifiers that can be used for a device-to-device communication;
determining candidate connection identifiers usable for a device-to-device communication with a peer device among the unused connection identifiers and a number of assignable connection identifiers that are assignable to a connection with the peer device based on data characteristics of the connection;
transmitting, to the peer device, first information including the candidate connection identifiers and the determined number of assignable connection identifiers to the peer device;
receiving, from the peer device, second information relating to at least two connection identifiers selected by the peer device based on the first information; and
communicating with the peer device through at least two time resource regions corresponding to a group to which the at least two connection identifiers indicated by the second information belong,
wherein the plurality of connection identifiers are divided into a plurality of groups, the groups each including a plurality of connection identifiers, the plurality of connection identifiers belong to each group being mapped to different time resource regions, and
wherein the at least two connection identifiers indicated by the second information are selected from a single group of the plurality of groups.

2. The method according to claim 1, wherein the first information indicates the determined number of assignable connection identifiers that are assignable to the connection depending on a frequency of generating data transmission on the connection.

3. The method according to claim 1, wherein the second information indicates that as many connection identifiers as a number depending on the data characteristics in one group among the plurality of groups are assigned to the connection.

4. The method according to claim 1, wherein the determined number of assignable connection identifiers are determined depending on a frequency of generating the data transmission on the connection.

5. A method for assigning connection identifiers for a device-to-device communication, the method comprising:
identifying unused connection identifiers among a plurality of connection identifiers that can be used for the device-to-device communication;
receiving, from a peer device, first information including candidate connection identifiers usable for the device-to-device communication with the peer device among the unused connection identifiers and a number of assignable connection identifiers that are assignable to a connection with the peer device based on data characteristics of the connection;
selecting at least two connection identifiers based on the candidate connection identifiers and the number of assignable connection identifiers indicated by the first information;
transmitting, to the peer device, second information relating to the at least two selected connection identifiers; and
communicating with the peer device through at least two time resource regions corresponding to a group to which the at least two connection identifiers indicated by the second information belong, wherein the plurality of connection identifiers are divided into a plurality of groups, the groups each including a plurality of connection identifiers, the plurality of connection identifiers belong to each group being mapped to different time resource regions, and wherein the at least two connection identifiers indicated by the second information are selected from a single group of the plurality of groups.

6. The method according to claim 5, wherein the first information indicates the determined number of assignable connection identifiers that are assignable to the connection depending on a frequency of generating data transmission on the connection.

7. The method according to claim 5, wherein the second information indicates that as many connection identifiers as a number depending on the data characteristics in one group among the groups are assigned to the connection.

8. The method according to claim 5, wherein the determined number of assignable connection identifiers are determined depending on a frequency of generating data transmission on the connection.

9. A device for assigning connection identifiers for a device-to-device communication, the device comprising:

a controller configured to:
identify unused connection identifiers among a plurality of connection identifiers that can be used for the device-to-device communication,
determine candidate connection identifiers usable for the device-to-device communication with a peer device among the unused connection identifiers, and
determine a number of assignable connection identifiers that are assignable to
a connection with the peer device based on data characteristics of the connection;

a transmitter configured to transmit, to the peer device, first information including the candidate connection identifiers and the determined number of assignable connection identifiers; and a receiver configured to receive, from the peer device, second information relating to at least two connection identifiers selected by the peer device based on the first information, wherein the controller is configured to communicate with the peer device through at least two time resource regions corresponding to a group to which the at least two connection identifiers indicated by the second information belong, wherein the plurality of connection identifiers are divided into a plurality of groups, the groups each including a plurality of connection identifiers, the plurality of connection identifiers belong to each group being mapped to different time resource regions, and wherein the at least two connection identifiers indicated by the second information are selected from a single group of the plurality of groups.

10. The device according to claim 9, wherein the first information indicates the determined number of assignable connection identifiers that are assignable to the connection depending on a frequency of generating data transmission on the connection.

11. The device according to claim 9, wherein the second information indicates that as many connection identifiers as a number depending on the data characteristics in one group among the plurality of groups are assigned to the connection.

12. The device according to claim 9, wherein the determined number of assignable connection identifiers is determined depending on a frequency of generating data transmission on the connection.

13. A device for assigning connection identifiers for a device-to-device communication, the device comprising:

a controller configured to:
identify which connection identifiers are unused from among a plurality of connection identifiers that can be used for the device-to-device communication, and
select at least two connection identifiers based on candidate connection identifiers usable for the device-to-device communication with a peer device among the unused connection identifiers and a number of assignable connection identifiers that are assignable to a connection with the peer device based on data characteristics of the connection;

a receiver configured to
receive, from the peer device, first information including the candidate connection identifiers and the number of assignable connection identifiers, and
provide the first information for the controller; and a transmitter configured to transmit, to the peer device, second information relating to the at least two selected connection identifiers, wherein the controller is further configured to communicate with the peer device through at least two time resource regions corresponding to a group to which the at least two selected connection identifiers belong, wherein the plurality of connection identifiers are divided into a plurality of groups, the groups each including a plurality of connection identifiers, the plurality of connection identifiers belong to each group being mapped to different time resource regions, and wherein the at least two connection identifiers indicated by the second information are selected from a single group of the plurality of groups.

14. The device according to claim 13, wherein the first information indicates the determined number of assignable connection identifiers that are assignable to the connection depending on a frequency of generating data transmission on the connection.

15. The device according to claim 13, wherein the second information indicates that as many connection identifiers as a number depending on the data characteristics in one group among the groups are assigned to the connection.

16. The device according to claim 13, wherein the determined number of assignable connection identifiers is determined depending on a frequency of generating data transmission on the connection.

* * * * *